US008850596B2

(12) United States Patent
Ramakrishnan

(10) Patent No.: US 8,850,596 B2
(45) Date of Patent: Sep. 30, 2014

(54) DATA LEAKAGE DETECTION IN A MULTI-TENANT DATA ARCHITECTURE

(71) Applicant: Microsoft Corporation, Redmond, WA (US)

(72) Inventor: Chandru Ramakrishnan, Cary, NC (US)

(73) Assignee: Microsoft Corporation, Redmond, WA (US)

( * ) Notice: Subject to any disclaimer, the term of this patent is extended or adjusted under 35 U.S.C. 154(b) by 28 days.

(21) Appl. No.: 13/671,888

(22) Filed: Nov. 8, 2012

(65) Prior Publication Data

US 2014/0130175 A1     May 8, 2014

(51) Int. Cl.
*G06F 21/00*     (2013.01)

(52) U.S. Cl.
USPC ...... 726/26; 726/2; 726/23; 726/25; 713/165; 713/193

(58) Field of Classification Search
USPC .......................................................... 726/26
See application file for complete search history.

(56) References Cited

U.S. PATENT DOCUMENTS

| | | | |
|---|---|---|---|
| 7,950,062 B1* | 5/2011 | Ren et al. ................. | 726/26 |
| 2004/0221118 A1* | 11/2004 | Slater et al. .............. | 711/163 |
| 2004/0255140 A1* | 12/2004 | Margolus et al. ......... | 713/193 |
| 2005/0055399 A1* | 3/2005 | Savchuk .................. | 709/203 |
| 2006/0047907 A1* | 3/2006 | Shiga et al. .............. | 711/114 |
| 2006/0059238 A1* | 3/2006 | Slater et al. .............. | 709/206 |
| 2007/0094378 A1* | 4/2007 | Baldwin et al. .......... | 709/223 |
| 2007/0266037 A1* | 11/2007 | Terry et al. ............... | 707/100 |
| 2008/0104393 A1* | 5/2008 | Glasser et al. ........... | 713/165 |
| 2008/0144079 A1* | 6/2008 | Pandey et al. ............ | 358/1.15 |
| 2008/0294696 A1* | 11/2008 | Frandzel .................. | 707/200 |
| 2009/0013141 A1* | 1/2009 | Kinoshita ................. | 711/163 |
| 2010/0186067 A1 | 7/2010 | Stephenson et al. | |
| 2012/0136836 A1 | 5/2012 | Liu | |

OTHER PUBLICATIONS

Ristenpart, Thomas et al., "Hey, You, Get Off of My Cloud: Exploring Information Leakage in Third-Party Compute Clouds," 16th ACM Conference on Computer and Communications Security, CCS'09, (downloaded from: http://www.tau.ac.il/~tromer/papers/cloudsec.pdf), (14 pages), Nov. 9-13, 2009.

Simmhan, Yogesh et al., "An Analysis of Security and Privacy Issues in Smart Grid Software Architectures on Clouds," 2011 IEEE 4th International Conference on Cloud Computing, (downloaded from: http://ieeexplore.ieee.org/stamp/stamp.jsp?tp=&arnumber=6008758), pp. 582-589, Nov. 2011.

(Continued)

*Primary Examiner* — Kambiz Zand
*Assistant Examiner* — Yonas Bayou
(74) *Attorney, Agent, or Firm* — Kevin Sullivan; Katherine Drakos; Micky Minas

(57) ABSTRACT

Embodiments relate to a process for identifying data leakage in a data storage system. A table is created with multiple units. Each unit in the table has a unique identifier as a leading key in a schema. Two partitions are set in the table, and one of the partitions is set as unavailable. One or more queries are run on the table. Any queries that attempt to access the unavailable partition are identified through an error message or other alert.

20 Claims, 3 Drawing Sheets

(56) References Cited

OTHER PUBLICATIONS

Squicciarini, Anna et al., "Preventing Information Leakage from Indexing in the Cloud," 2010 IEEE 3rd International Conference on Cloud Computing, (downloaded from: http://ieeexplore.ieee.org/stamp/stamp.jsp?tp=&arnumber=5557993), pp. 188-195, Jul. 5, 2010.

Zhang, Xuyun et al., "A Privacy Leakage Upper-bound Constraint based Approach for Cost-effective Privacy Preserving of Intermediate Datasets in Cloud," (downloaded from: http://www.computer.org/portal/web/csdl/doi/10.1109/TPDS.2012.238), (11 pages), Aug. 8, 2012.

Lin, Xing et al., "Towards Fair Sharing of Block Storage in a Multi-tenant Cloud," 4th USENIX Workshop on Hot Topics in Cloud Computing, (downloaded from: https://www.usenix.org/system/files/conference/hotcloud12/hotcloud12-final57.pdf), (6 pages), Jun. 2012.

\* cited by examiner

DATA LEAKAGE DETECTION IN A MULTI-TENANT DATA ARCHITECTURE

BACKGROUND

Online hosted services may use separate databases for each customer. Using separate databases provides data isolation, which is optimal for customer security and privacy because no customer has access to another's database. This data isolation comes at the cost of requiring very many databases that must be maintained separately. Each database will have an associated cost that is passed on to the client or borne by the host. Database costs can be reduced through data consolidation if multiple customers share the same database. However, using multi-tenant data storage opens the possibility of data leakage among customers.

A standard approach for building a multi-tenant data storage system is to horizontally partition the data using a unique identifier as a leading key in the database schema. All queries then use the identifier in a predicate. The queries should only retrieve data for the customer whose identifier is used. This approach exposes the risk that any query missing an identifier predicate may result in data being retrieved from multiple partitions. This data leakage may expose data from one customer partition to other unrelated customers on the multi-tenant service.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The techniques described herein can be applied in any setting where consolidated data storage is provided for multiple customers and where a unique key is used to partition that data in a shared storage.

In large and complex storage systems that have a large schema, ensuring and verifying the predicate on each query in the system can be a painstaking manual process. The techniques described herein disclose a method for providing strong guarantees of correctness by forcing queries that are missing an identifier predicate to fail. As a result, leakage problems are detectable and correctable with much less effort. In one embodiment, these techniques are enabled on production systems so that a query will fail rather than leak customer data.

Previous solutions require developers to conform to a certain pattern and have no runtime enforcement. For example, in traditional database systems there may be functions that enforce a certain pattern of data access.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
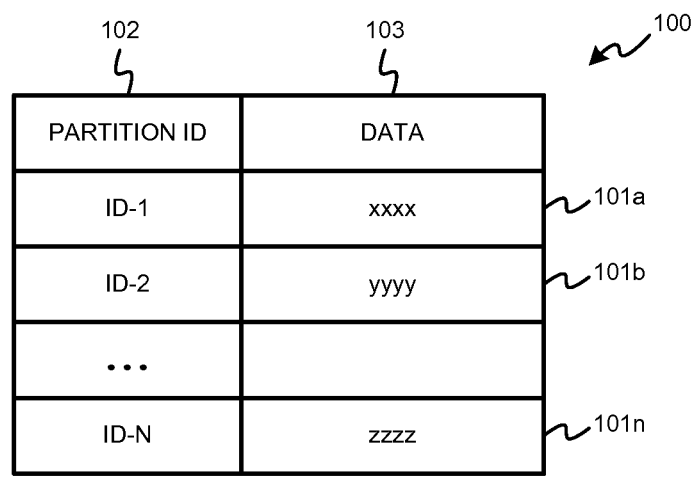
FIG. 1 illustrates a table that has been partitioned into multiple units.

FIG. 1 illustrates a table 100 that has been partitioned into multiple units 101*a-n*. The table 100 may be part of any storage system that can be partitioned. For example, in a SQL Server® system, table may be partitioned into different file group units; in Windows Azure™ Table Storage, the table may be partitioned into storage units; and in a flat-file storage system, the table may be partitioned into file units. The entries in table 100 may be horizontally partitioned with each partition designated using a partition identifier (PartitionId) in column 102. For example, the PartitionId 102 may correspond to a customer identifier, and the other columns in each partition may represent customer data 103.

Figure 2:
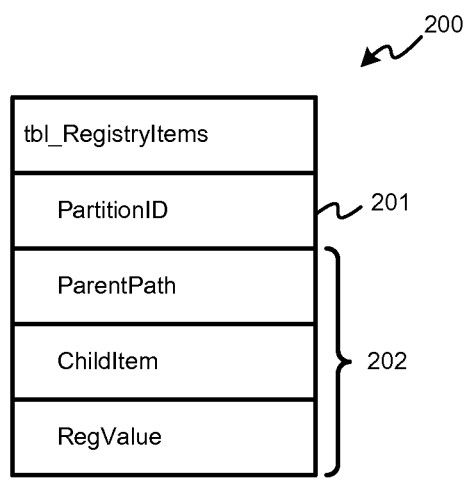
FIG. 2 illustrates a schema used in one embodiment.

In an example embodiment, customer data may be stored in a table (tbl_RegistryItems) using the schema 200 shown in FIG. 2. In this schema 200, the customer identifier is the column labeled PartitionId 201. Data for each customer is stored in the remaining columns 202.

Queries against this schema use an identifier predicate for the PartitionId column, which is used to identify a desired customer. As long as a query includes the identifier predicate, only data for the associated customer will be returned. However, if the identifier predicate is not included in the query, then data from other customers may be returned. This data leakage from a multi-tenant database is not acceptable. Accordingly, the queries used for the multi-tenant storage system should be tested for potential data leakage errors.

In one solution, a dummy or sentinel value is introduced in the customer identifier (e.g. PartitionId) range. This value is never actually used to store any valid customer data, but instead is established just for query verification purposes. Each table in the multi-tenant schema is partitioned so that this dummy value goes to its own unit (i.e., file group, storage unit, or file). The dummy unit is marked as inaccessible so that any query that requires access to the dummy unit will fail.

The schema 200 of FIG. 2 can be used as an example. Assuming that PartitionId 201 is of type integer and starts assignment at 1, two partitions (Partition 0 and Partition 1) are set up on that table. The PartitionId for each partition is set as follows:

Partition 0: PartitionId<=−1
Partition 1: PartitionId>=0

The file that would contain data for PartitionId<=−1 (i.e., for Partition 0) is set as offline. As a result, a query with an identifier predicate corresponding to Partition 0 would fail because that unit is offline. Additionally, any query that is missing a PartitionId clause would attempt to access all partitions, including Partition 0. However, the attempt to access the data in Partition 0 would fail because the file containing that data is offline and inaccessible.

For example, the following query may be run against the database:

```
select *
from tbl_RegistryItems
```

This query attempts to read from all units (*). However, Partition 0 is offline, so it will be inaccessible. As a result, an error message will be generated if there is an attempt to read the offline unit. An example error message might be:

Msg 679, Level 16, State 1, Line 2
One of the partitions of index 'pk_tbl_RegistryItems' for table 'dbo.tbl_RegistryItems' (PartitionId −1 ) resides on a file group ("test_offline") that cannot be accessed because it is offline, restoring, or defunct. This may limit the query result.

The appearance of such an error message serves as a warning to the database provider that the query was improperly formed and was attempting to read across multiple customers. In this case, the error is determined to be a missing PartitionId predicate in the query, which resulted in the query not being limited to a particular customer unit.

Figure 3:
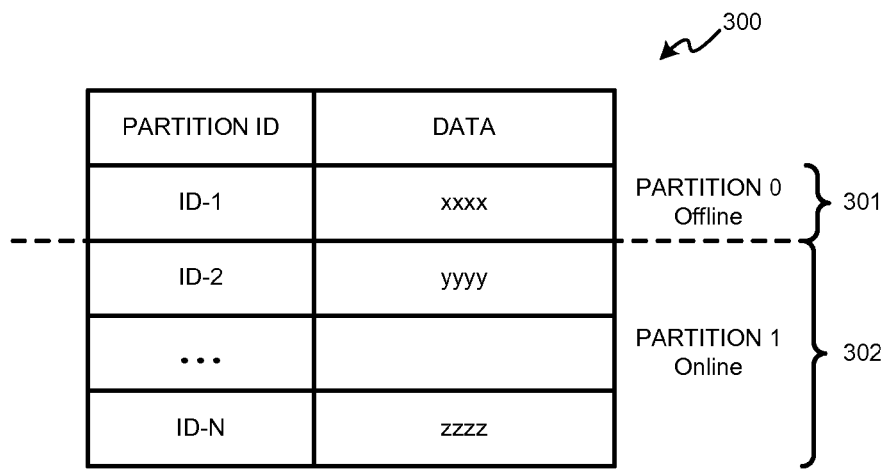
FIG. 3 illustrates a database having two partitions according to one embodiment.

FIG. 3 illustrates a database 300 having two partitions—Partition 0 (301) and Partition 1 (302). Other partitions may be established in database 300, but are not relevant to the query evaluation process described herein. It will be understood that each partition 301, 302 may include one or more units of the database 300. Partition 0 (301) has been set to offline and is inaccessible to queries. Partition 1 (302) remains online.

Database 300 may support hundreds of customers, for example, each with its own partition. Also, there may have thousands of lines of code associated with database 300. It is difficult reliably test the isolation of each partition, particularly when the code is updated routinely, which would require each query to be individually tested.

If it is assumed that the queries include the required identifier predicate, then a query may be run for a particular customer using that customer's PartitionId. However, if one or more queries in the code actually do not have the identifier predicate, then the query will attempt to read all partitions—including Partition 0, which is offline and inaccessible. The result of such a malformed query will be an error message warning that the query attempted to access the offline partition.

This test may be run, for example, whenever new developer code is added or checked-in. The test may be performed before releasing the updated code for use by customers.

Figure 4:
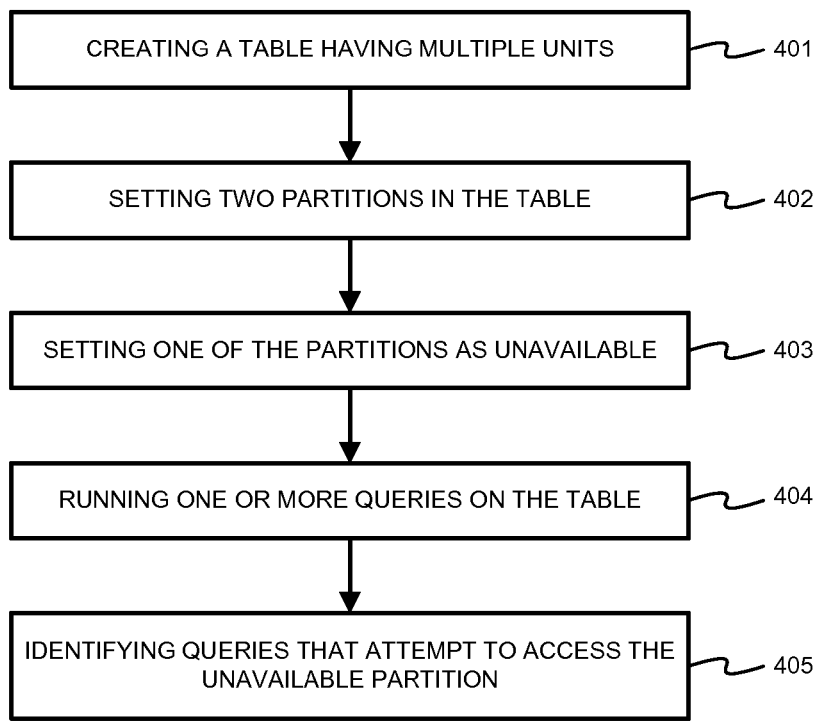
FIG. 4 is a flowchart illustrating a process or method for verifying that each query in a storage system includes a partition identifier.

FIG. 4 is a flowchart illustrating a process or method for verifying that each query in a storage system includes a partition identifier. The process may be a computer-implemented method embodied in instructions that are stored on a computer-readable storage medium. The process may be performed by a data storage system, for example. In step 401, a table is created with multiple units. Each unit in the table has a unique identifier as a leading key in a schema. In step 402, two partitions are set in the table. In step 403, one of the partitions is set as unavailable, which may include, for example, a partition that is offline, restoring, or defunct. In step 404, one or more queries are run on the table. In step 405, any queries that attempt to access the unavailable partition are identified.

The queries that attempt to access the unavailable partition may trigger an error message, for example. When the error message is received, then the system knows that one of the queries attempted to access an unavailable partition, which is likely caused by that query missing an identifier predicate. The query that triggered the error message is then identified by the system. The query that triggered the error message may be modified, for example, by adding an identifier predicate to the query.

The unique identifier may be used as a partition identifier to separate data belonging to individual users. The partition identifier may be of type integer with assignment to the users starting at one. A first partition may be established corresponding to partition identifier values less than or equal to negative one A second partition may be established for partition identifier values greater than or equal to zero. The first partition is set as unavailable to test queries. It will be understood that the system is not limited to integer partitioning but can also be used with other partitioning. For example, similar results may be achieved using a string customer identifier. A selected customer number, such as XXXXXXX or "DOESNOTEXIST" can be redirected to the offline partition. Similar schemes may be used for other data types, such as string, GUIDs, and the like.

The table may be horizontally partitioned into multiple partitions representing individual users. The data storage system may be a hosted multi-tenant data storage system having horizontal partitions that separate tenant data, where queries use an identifier predicate limit access to a specific tenant's data.

It will be understood that steps 401-405 of the process illustrated in FIG. 4 may be executed simultaneously and/or sequentially. It will be further understood that each step may be performed in any order and may be performed once or repetitiously.

Figure 5:
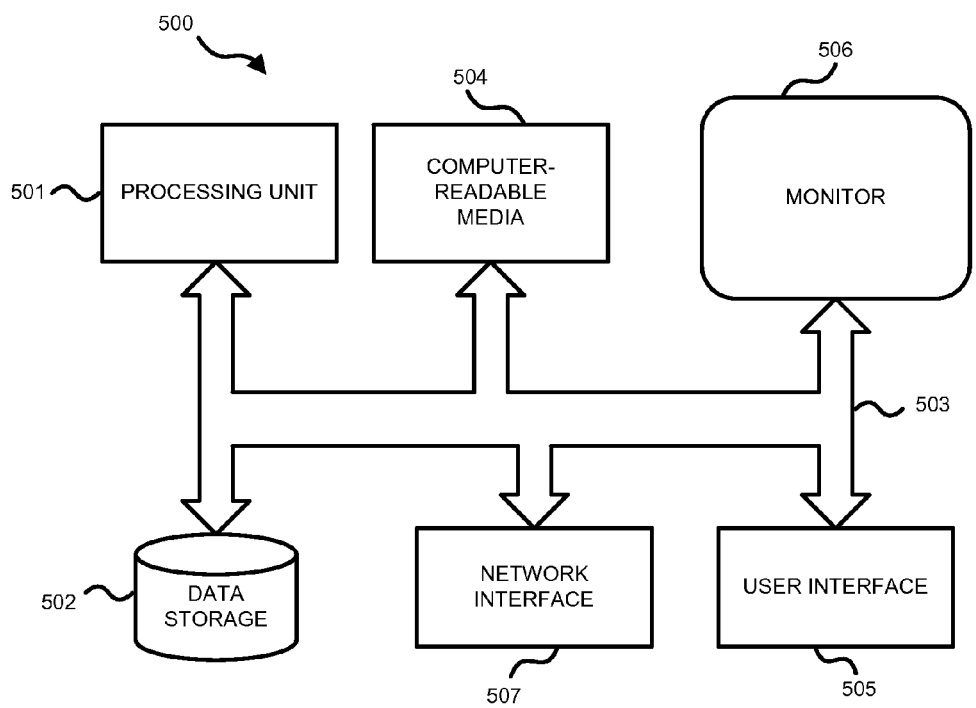
FIG. 5 illustrates an example of a suitable computing and networking environment.

FIG. 5 illustrates an example of a suitable computing and networking environment 500 on which the examples of FIGS. 1-4 may be implemented to provide a data storage system and to identify queries that may result in data leakage. The computing system environment 500 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 500. Components may include, but are not limited to, various hardware components, such as processing unit 501, data storage 502, such as a system memory, and system bus 503 that couples various system components including the data storage 502 to the processing unit 501. The system bus 503 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 typically includes a variety of computer-readable media 504. Computer-readable media 504 may be any available media that can be accessed by the computer 500 and includes both volatile and nonvolatile media, and removable and non-removable media, but excludes propagated signals. By way of example, and not limitation, computer-readable media 504 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 502 includes computer storage media in the form of volatile and/or nonvolatile memory such as read only memory (ROM) and random access memory (RAM). A basic input/output system (BIOS), containing the basic routines that help to transfer information between elements within computer 500, such as during start-up, is typically stored in ROM. RAM typically contains data and/or program modules that are immediately accessible to and/or presently being operated on by processing unit 501. By way of example, and not limitation, data storage 502 holds an operating system, application programs, and other program modules and program data.

Data storage 502 may also include other removable/non-removable, volatile/nonvolatile computer storage media. By way of example only, data storage 502 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

A user may enter commands and information through a user interface 505 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 501 through a user input interface 505 that is coupled to the system bus 503, but may be connected by other interface and bus structures, such as a parallel port, game port or a universal serial bus (USB). A monitor 506 or other type of display device is also connected to the system bus 503 via an interface, such as a video interface. The monitor 506 may also be integrated with a touch-screen panel or the like. Note that the monitor and/or touch screen panel can be physically coupled to a housing in which the computing device 500 is incorporated, such as in a tablet-type personal computer. In addition, computers such as the computing device 500 may also include other peripheral output devices such as speakers and printer, which may be connected through an output peripheral interface or the like.

The computer 500 may operate in a networked or cloud-computing environment using logical connections 507 to one or more remote devices, such as a remote computer. The remote computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 500 may be connected to a public or private network through a network interface or adapter 507. In some embodiments, a modem or other means for establishing communications over the network. The modem, which may be internal or external, may be connected to the system bus 503 via the network interface 507 or other appropriate mechanism. A wireless networking component such as comprising an interface and antenna may be coupled through a suitable device such as an access point or peer computer to a network. In a networked environment, program modules depicted relative to the computer 500, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer-implemented method, comprising:
creating, by a data storage system, a table having multiple units, each unit having a unique identifier as a leading key in a schema;
setting, by the data storage system, two or more partitions in the table;

setting, by the data storage system, a selected partition as unavailable;

running, by the data storage system, one or more queries on the table;

identifying, by the data storage system, any queries that attempt to access the unavailable partition, and detecting, by the data storage system, data leakage based upon the identifying.

2. The computer-implemented method of claim 1, further comprising:

receiving, by the data storage system, an error message triggered by an attempt to access an unavailable partition; and identifying, by the data storage system, a query that triggered the error message.

3. The computer-implemented method of claim 2, further comprising:

modifying, by the data storage system, the query that triggered the error message by adding an identifier predicate to the query.

4. The computer-implemented method of claim 1, wherein the unique identifier is used as a partition identifier to separate data belonging to individual users.

5. The computer-implemented method of claim 4, wherein any of the partitions may be set as unavailable.

6. The computer-implemented method of claim 1, wherein the unavailable partition is set as offline.

7. The computer-implemented method of claim 1, further comprising:

horizontally partitioning, by the data storage system, the table into multiple partitions representing individual users.

8. The computer-implemented method of claim 1, wherein the data storage system is a hosted multi-tenant data storage system having horizontal partitions that separate tenant data, and wherein queries use an identifier predicate limit access to a specific tenant's data.

9. A computer system, comprising:

one or more processors; and a memory coupled to the one or more processors, the memory having stored thereon computer-executable instructions that, upon execution by the one or more processors, cause the computer system to:

create a table having multiple units, each unit having a unique identifier as a leading key in a schema;

set two or more partitions in the table;

set one of the partitions as offline;

run one or more queries on the table;

identify any queries that attempt to access the offline partition; and detect data leakage based upon the identification.

10. The computer system of claim 9, wherein the computer-executable instructions, upon execution by the one or more processors, further cause the computer system to:

receive an error message triggered by an attempt to access an offline partition; and identify a query that triggered the error message.

11. The computer system of claim 10, wherein the computer-executable instructions, upon execution by the one or more processors, further cause the computer system to:

modify the query that triggered the error message by adding an identifier predicate to the query.

12. The computer system of claim 9, wherein the unique identifier is used as a partition identifier to separate data belonging to individual users.

13. The computer system of claim 12, wherein any of the partitions may be set as unavailable.

14. The computer system of claim 9, wherein the unavailable partition is set as offline.

15. The computer system of claim 9, wherein the computer-executable instructions, upon execution by the one or more processors, further cause the computer system to:

horizontally partition the table into multiple partitions representing individual users.

16. A computer-readable storage device having computer-executable instructions stored thereon that, upon execution by at least one processor of a computer system, cause the computer system to:

create a table having multiple units, each unit having a unique identifier as a leading key in a schema;

set two or more partitions in the table;

set a selected partition as unavailable;

run one or more queries on the table;

identify any queries that attempt to access the unavailable partition; and detect data leakage based upon the identification.

17. The computer-readable storage device of claim 16, wherein the computer-executable instructions, upon execution by the at least one processor, further cause the computer system to:

receive an error message triggered by an attempt to access an unavailable partition; and identify a query that triggered the error message.

18. The computer-readable storage device of claim 17, wherein the computer-executable instructions, upon execution by the at least one processor, further cause the computer system to:

modify the query that triggered the error message by adding an identifier predicate to the query.

19. The computer-readable storage device of claim 16, wherein the unique identifier is used as a partition identifier to separate data belonging to individual users.

20. The computer-readable storage device of claim 19, wherein the first partition is set as unavailable.

* * * * *